W. L. SCHELLENBACH.
GEARING.
APPLICATION FILED DEC. 4, 1911.
1,111,326.
Patented Sept. 22, 1914.
3 SHEETS—SHEET 2.
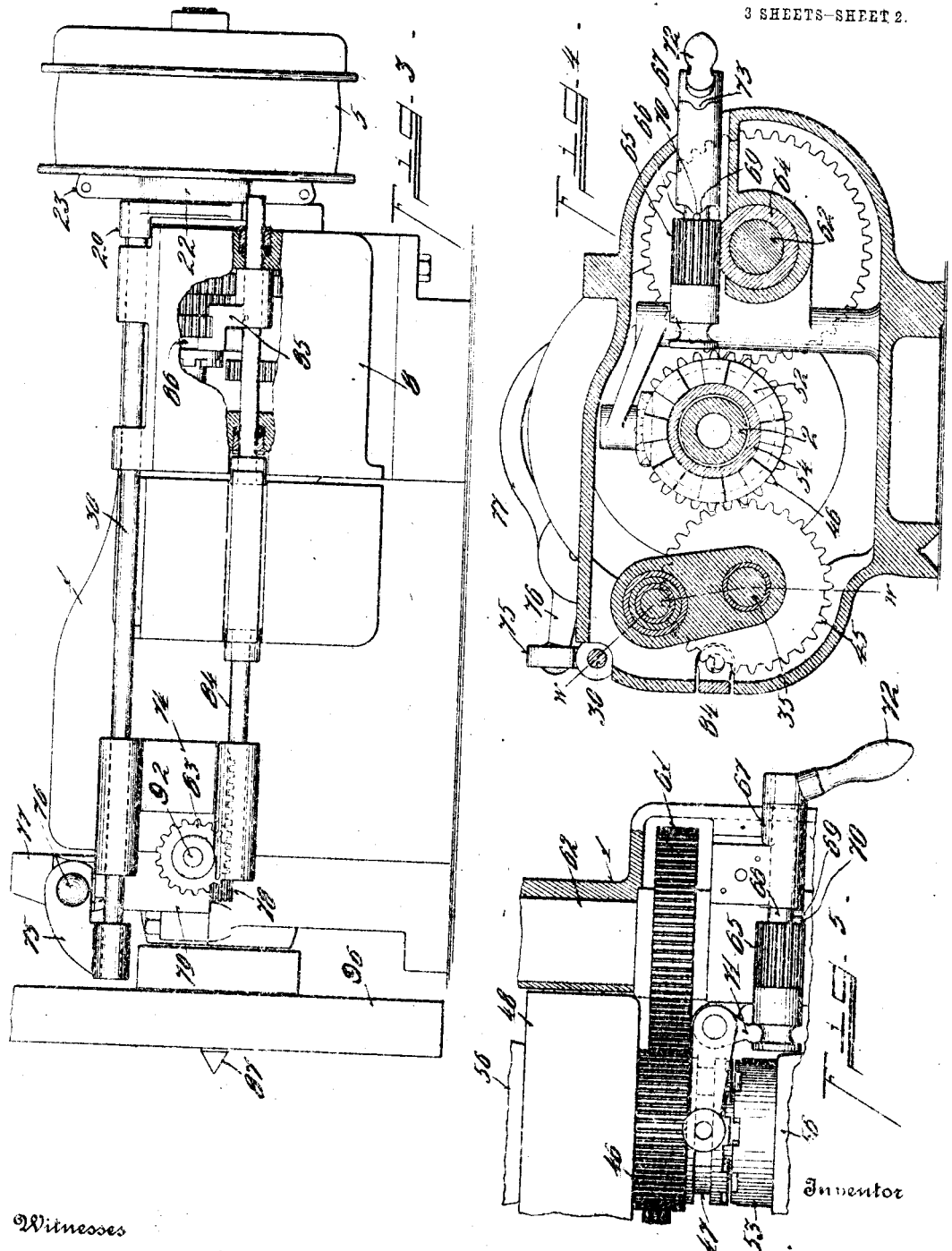
Witnesses
Inventor
William L. Schellenbach
By Nash & Nash
Attorneys

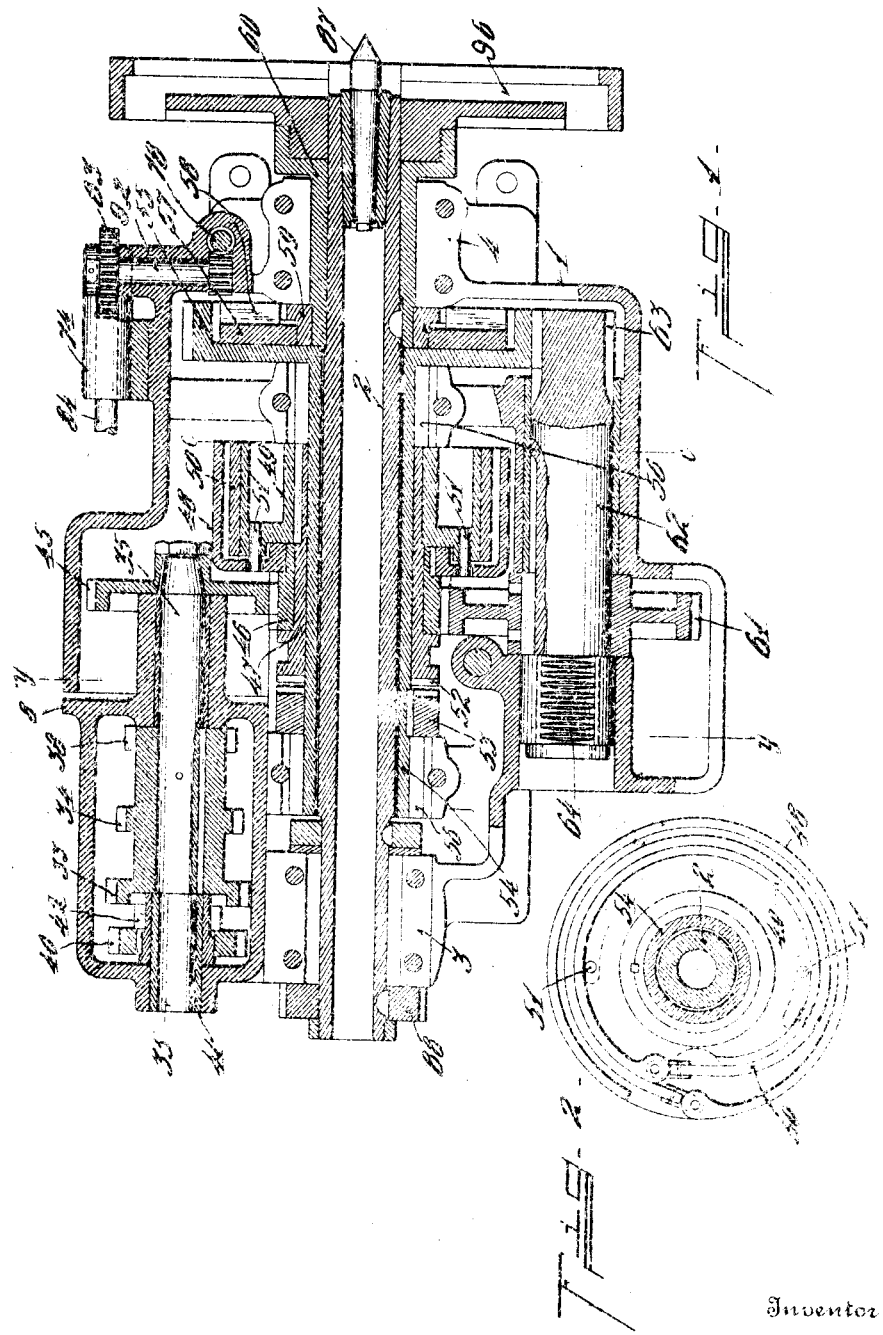

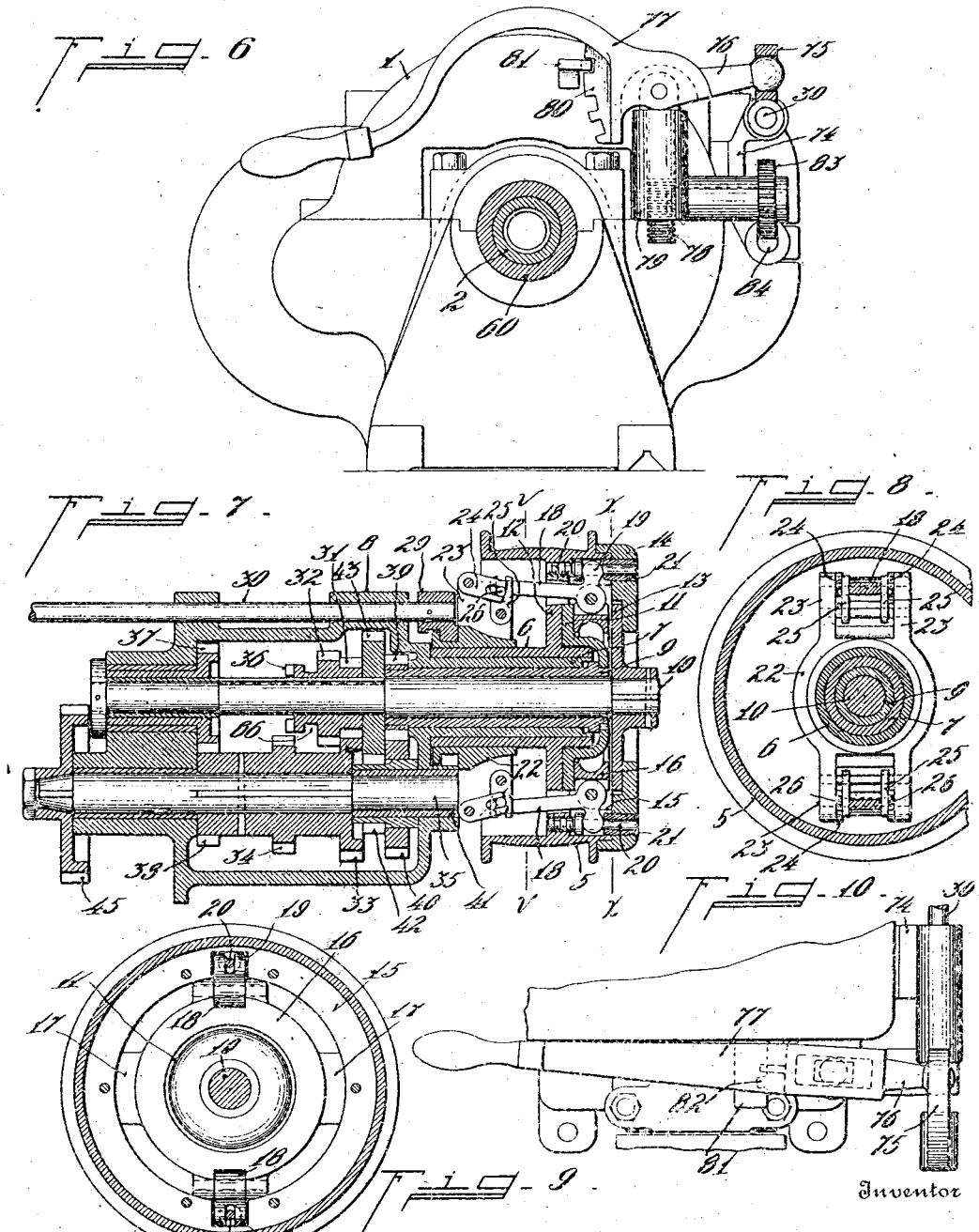

UNITED STATES PATENT OFFICE.

WILLIAM L. SCHELLENBACH, OF HARTWELL, OHIO, ASSIGNOR TO THE LODGE & SHIPLEY MACHINE TOOL COMPANY, OF CINCINNATI, OHIO, A CORPORATION OF OHIO.

GEARING.

1,111,326.  Specification of Letters Patent.  Patented Sept. 22, 1914.

Application filed December 4, 1911. Serial No. 663,937.

*To all whom it may concern:*

Be it known that I, WILLIAM L. SCHELLENBACH, a citizen of the United States, residing at Hartwell, in the county of Hamilton and State of Ohio, have invented certain new and useful Improvements in Gearing, of which the following is a specification.

My invention relates to an improvement primarily in a head-stock for engine lathes in providing a variety of speeds between the main driving pulley and the spindle and in the convenient and quick control thereof.

One of the objects of my invention is to provide a head-stock with a main driving pulley, with double-acting clutch mechanism for alternately controlling its driving connection with two series of variable speed systems of gearing.

Another object of my invention is to provide a head-stock with a variable speed system of gearing and single main driving pulley, with two driven shafts concentric with each other and with the driving pulley and clutching mechanism for alternately engaging said driving pulley with either one of said concentric shafts.

Another object of my invention is to provide a lathe head-stock, with a variable speed system of gearing, comprising sliding gears, with lever mechanism for shifting said gears, and means coördinate therewith controlling the main driving pulley transmitting power to said system of gearing, whereby the power is cut off in advance of a shifting of the sliding gears.

Another object of my invention is to provide a head-stock with variable speed systems of gearing, and means for controlling the drive and changes of speed of the entire range of forward speeds by a single lever operative to cut out the drive in making a change of the speed prior to operating the lever to change the relative trains of power transmission mechanism.

Another object of my invention is to interpose between the spindle of a machine tool and its driving mechanism back lash mechanism to eliminate or neutralize forces opposed to the forward rotation of the spindle, so that the finished surface of work is not marred by impressions primarily caused by the lost motion between the intermeshing teeth of the gears in the driving or transmission mechanism or chatter thereof.

Another object of my invention is to provide back lash mechanism between the driving mechanism and spindle of a head-stock, in which a variable speed system of gearing is preferably employed for imparting the higher speeds to the drill spindle, and with means for connecting the main driving medium to the system of gearing for producing the lower speeds directly with the spindle, whereby the higher speeds are transmitted to the spindle through back lash mechanism and the lower speeds directly.

Another object of my invention is to provide means for disconnecting the aforesaid back lash mechanism from the spindle when transmitting mechanism is directly connected to the spindle, primarily in making the heavier or rough machining of the work. The transfer being preferably made simultaneous with the control of the speed changing mechanism of the transmission devices, so that the back lash mechanism is in commission when the spindle is driven at its high speeds and out of commission with the lower speeds.

The features of the invention are more fully set forth in the description of the accompanying drawings, forming a part of this specification in which:—

Figure 1 is a horizontal section through the head-stock and spindle and through certain gear mechanism on both sides of the spindle. Fig. 2 is a section on line *c, c*, Fig. 1, through the spindle. Fig. 3 is a rear elevation of the head-stock with parts cut away to show interior construction. Fig. 4 is a section on line *y, y*, Fig. 1. Fig. 5 is a detailed plan view, partly in section, of the clutch controlling mechanism for controlling the slow speed transmission to the spindle. Fig. 6 is an end elevation of the head-stock with the spindle in section. Fig. 7 is a section on line *w, w*, Fig. 4. Fig. 8 is a section on line *v, v*, Fig. 7. Fig. 9 is a section on line *x, x*, Fig. 7. Fig. 10 is a detailed top plan view of the forward portion of the head-stock illustrating the lever mechanism for controlling the clutch mechanism of the main driving pulley and for shifting the sliding gear.

In the general design of the head-stock, the rotating shaft or spindle elements are journaled in long bearings and with all concentric rotating elements mounted in separate bearings or arranged to relieve one from the strains of the second, thereby providing a head-stock of greater efficiency and increasing its life.

1 represents the frame, 2 represents the spindle journaled in the bearings 3, 4. The spindle, in this instance, is driven from a main driving pulley through a variable speed system of gearing, mounted within the head-stock and arranged in two sets, one for transmitting the higher speeds through mechanism in connection with the spindle capable of neutralizing forces opposed to forward rotation and the second for transmitting the lower speeds, preferably in positive connection with the spindle, although lateral strains of the spindle are not imparted or taken up by the gearing. The main driving pulley is provided with alternately actuated clutch mechanism for alternately transmitting motion to two different trains of gearing, with the mechanism operated or controlled by a single lever.

5 represents a pulley, having an elongated hub 6, loosely journaled upon the sleeve projection 7, of the frame 8. The frame 8 is detachably connected to the main frame 1, and supports a primary speed changing gear system and the main driving element. The whole forms a unit readily removable from the head-stock, with the head-stock capable of receiving a second similar unit of different speed ratios or forms of drive. This interchangeability is quite an advantage, in that the head-stock proper can remain intact and unchanged and the lathe as a whole readily equipped in the shop for a particular style of drive desired, without the necessity for providing a separate head-stock or disturbing the spindle for each type of drive, as, for instance, in a lathe in which it was not desired to provide for a larger variety of speeds as herein embodied, it would only be necessary to change the system of gearing contained as a unit in the supplemental frame 8, for a second style or type of drive. This enables the manufacture of a standard type of head-stock capable of use for any type of drive, cone pulley, variable speed motor, or variable speed gearing type with single pulley and which change is made by merely detaching the supplemental frame 8 and inserting a second. With the pulley 5, mounted as shown, the belt strains are not transmitted to the driven shafts, owing to its independent bearing upon the sleeve 7, of the frame 8.

9 represents a sleeve shaft journaled within the sleeve bearing 7, adapted to be clutched to the pulley 5, and 10 represents a shaft projected through the sleeve shaft 9 and concentric therewith, likewise adapted to be clutched with the pulley 5, independent of sleeve shaft 7 and with the clutching mechanism arranged so that both cannot be simultaneously clutched to the pulley.

11 represents a disk fixed to the sleeve shaft 9, adapted to frictionally engage the web 12, of the pulley 5, for driving the sleeve shaft 9.

13 represents a disk fixed to the shaft 10, adapted to be frictionally engaged against the plate 14, fixed to the pulley. The pulley is provided with an annular flange 15, supporting the clutch disk 16, which is adapted to be shifted to alternately engage the disk members 11 and 13 for connecting the same to the driving pulley 5. The clutch plate 16 is provided with lugs 17, which bear upon the inner surface of the annular flange 15, of the pulley 5, with two of such oppositely disposed lugs notched to receive the clutch lever 18, which is pivotally mounted on the clutch plate 16, as seen in Figs. 7 and 9. As illustrated, two of such clutch levers are provided, both being duplicates of each other. Each clutch lever 18 has a projecting arm 19, having a ball or cylindrical end, adapted to engage the oppositely disposed set screws 20, 21, mounted within the pulley 5 and pulley plate 14 respectively and having pivotal action therewith. As illustrated, the screw 20 has a projecting stem passing through the nut 21, with the lever arm 19 straddling said stem, thereby providing means for adjusting the screw 20, from the outside face of the pulley. It is obvious, however, that various forms of clutch mechanism may be provided for alternately engaging the sleeve shaft 9 and shaft 10, so as to drive the same independently from a single pulley and with the clutch mechanism preferably controlled by a single lever, and, therefore, I do not wish to be limited to the precise form of clutch mechanism herein shown and described.

The clutch levers 18 are rocked by the following mechanism:—22, (see Figs. 7 and 8), represents a knuckle sleeve having duplicate sets of ears 23, projected therefrom, between which are pivoted the yoke links 24, 25. 26 represents a pin, fixed to the lever 18 and engaged with the yoke ends of the links 24, 25, to swing the levers 18 when the knuckle sleeve is shifted laterally, which action will move the clutch disk 16, so as to engage disk 11 or disk 13 and frictionally clamp either one of them with the driving pulley 5. As illustrated, the knuckle sleeve is slidably mounted upon the outer surface of the hub 6, of the pulley 5 and provided with an annular groove adapted to receive the yoke plate 29, which is connected to the shifting rod 30. The shifting rod 30 protransmitted to the spindle, through the sleeve 47, connected with the back lash mechanism when the sleeve is engaged with the clutch member 53. The lower speeds are obtained by the following mechanism. 61 represents a gear in mesh with gear 46 and splined upon the shaft 62. 63 represents gear teeth formed in one end of said shaft and adapted to mesh with the teeth of gear 55 and when said gear 63 is so meshed, power is transmitted through the variable speed system of gearing to shaft 35, gears 45, 48, 61, shaft 62, gear 63, and gear 55, through the spindle coupling members 57, 59, 60. With such drive in commission, the sleeve 47 is disengaged from the clutch member 53 and the mechanism for shifting the sleeve member 47 is so arranged that a simultaneous shifting of shaft 62 is had, so that it will be impossible to have the sleeve member 47 in mesh with the clutch member 53, at the same time the gear 63 is intermeshed with the gear 55. The mechanism is such as to only permit one gear to be in driving connection at a time.

The shifting mechanism comprises the following instrumentalities:—64 represents a rack sleeve loosely mounted on shaft 62, (see Figs. 1 and 4), with the teeth of said rack sleeve intermeshed with the teeth of the rack gear 65, fixed on the rock shaft 66. Thus, by rotating the shaft 66, the shaft 62 can be slid into and out of engagement with the gear 55. 67 represents a bearing, supporting the shaft 66, one end provided with a cam boss 69 and adapted to engage with the pin 70, projected from the shaft 66, whereby as the shaft is rotated it will be moved in or out by its engagement with the cam boss 69. 71 represents a bell crank lever pivotally mounted within the head-stock frame, one arm thereof engaging with the shaft 66, as illustrated in Fig. 5, with the second arm of said bell crank lever engaging into an annular groove of the sleeve 47. Thus, as the bell crank lever 71 is rocked, it will engage or disengage the connection between the sleeve 47 and clutch member 53. The pin engagement of the shaft 66 with the cam boss 69 is so relatively proportioned that the shaft 62 will be moved so as to insure prior disengagement of the gear 63, with the gear 55, before it is effective upon the bell crank lever 71. 72 represents a handle fixed upon the shaft 66, which is provided with a boss projection 73, adapted to engage into a notch formed in the bracket 67, serving as a lock to maintain the various elements in position employed for shifting the sleeve 47 into engagement with the clutch member 53. This also insures positive action in laterally sliding or moving the shaft 66 in positively insuring such action of the shaft 66, it being a coördinate action with the pin. It is obvious, however, that the movement of the shaft in one direction can be automatically obtained by the provision of a spring, and it is also obvious, that various other forms of mechanism could be provided to bring about the function of preventing simultaneous coupling of counteracting rotary elements, as herein provided.

The mechanism for shifting the sliding gears 31, 32, and operating the clutch mechanism of pulley 5, comprise the following instrumentalities:—As will be seen in Fig. 3, the shifting rod 30 is carried at the forward end of the head-stock and mounted in bearings formed in the frame 8 and the bracket bearing 74, fixed to the head-stock frame 1. 75 represents an arm fixed to the rod 30. 76 represents an arm projected from the manipulating lever 77, provided with a spherical end engaging into a bore formed in the arm 75. The lever 77 is pivotally mounted upon the rack pin 78, loosely mounted within a bearing 79, with the pin arranged to have oscillating and vertical movement within said bearing. Thus, when the lever 77 is swung horizontally, the rod 30 will be shifted to the right or left as desired, operating the pulley clutch mechanism for rotating either the sleeve shaft 9 or shaft 10. The lever 77 is provided with a notched sector projection 80 to control its movement and to prevent vertical movement of the lever until it has been brought to a neutral position horizontally to disengage the clutch mechanism of the pulley 5 from either clutching position, for the reason that the lever 77 is also employed for shifting the sliding gears 31, 32, and it is preferable to have the power cut off in making a speed change. 81 represents a notched bracket plate, (see Figs. 6 and 10), provided with a notch 82, through which the sector 80 passes in the vertical movement of the lever 77, and the lever must be brought to such position before it can be thus moved. The notches on the sector 80 serve as locking means for maintaining the gears 31, 32, in their adjusted position. The rack pin 78 engages with a pinion fixed to the shaft 92, and 83 represents a second pinion having its teeth intermeshed with the rack rod 84 projected rearwardly and supported in suitable bearings formed in the supplemental frame 8 and head-stock 1. 85 represents a yoke arm fixed to the rack rod 84 and engaging with the annular groove 86, formed adjacent to the compound gears 31, 32. Thus, by vertically swinging the lever 77 with the spherical end of the arm 76, serving as a pivot, the rack pin 78 can be raised or lowered, as desired, for rotating the pinions on shaft 92 and horizontally sliding the rack rod 84 to bring the sliding gears 31, 32, and their clutch end 36 into the desired positions for producing the speed changes heretofore described.

It is obvious, that the shifting mechanism jects parallel with the spindle and to the nose end thereof and actuated by mechanism to be more fully hereinafter described.

As the alternate shifting of the clutch mechanism of the pulley 5 controls the rotation of two different shafts for rotating two different speed systems or trains of gearing, I will first describe the system controlled by shaft 10. 31, 32, represent compound gears splined upon the shaft 10 and slidable thereon for respectively engaging with gears 33, 34, fixed upon the shaft 35 journaled within bearings formed in the frame 8. Thus, as illustrated, in Fig. 7, gear 31 is in mesh with gear 33 and by rotating shaft 10, one speed will be imparted to shaft 35. Shifting the compound gears to disengage the gear 31 and engage gear 32 with the gear 34, a second speed is obtained. The compound gears 31, 32, are provided with clutch teeth 36, adapted to be engaged with companion clutch teeth on the gear 37, which is loosely journaled within the bearing in the frame 8 and concentric with shaft 10 and in mesh with a gear 38, fixed to shaft 35. Thus, when the compound gears are slid to bring the clutch teeth 36 into engagement with the clutch teeth of gear 37, the gears thereof would be disengaged from the gears 33, 34, producing a third ratio of speed between shafts 10 and 35.

With the system as shown, three different speed ratios are obtainable through shafts 10 and 35, by shifting the compound gears, but it is obvious, that the number may be reduced or multiplied, without departing from the features of my invention.

The compound gears 31 and 32 and their clutch member are also utilized when the sleeve shaft 9 is utilized and when said sleeve shaft is rotated, shaft 10 rotates as an intermediate or idler shaft.

39 represents a gear fixed to the sleeve shaft 9, in mesh with a gear 40, loose upon the shaft 35, or, as illustrated, is loosely journaled upon the sleeve bearing 41, mounted in the frame 8 and concentric with the shaft 35. The gear 40 is fixed to a gear 42, likewise loosely journaled upon the bearing 41 and in mesh with a gear 43, fixed upon the shaft 10. Thus when the shaft 10 is disengaged from the driving pulley 5 and sleeve shaft 9 engaged therewith, the shaft 10 in such instance will be rotated through the gearing 39, 40, 42 and 43, driven by the sleeve shaft 9, with the shaft 35, driven through the gearing heretofore described, with the speeds changed by sliding the compound gears 31, 32, as set forth. Thus, with the system illustrated, six changes of speed may be obtained between the driving pulley 5 and shaft 35, by alternately shifting the pulley clutch mechanism and sliding the compound gears 31, 32.

45 represents a gear fixed upon the shaft 35 in mesh with a gear 46 loosely mounted upon the sleeve 47, concentric with the spindle 2, see Fig. 1, and keyed with cup member 48, intermediate of the gear 46 and spindle 2. 49 represents a second member keyed to the sleeve 47, and 50 represents a strap, one end connected to the cup member 48, with the other end thereof connected to the member 49, as shown in Fig. 2, making one complete coil around the spindle.

51 represents a pin fixed to the member 49, projected into an oblong slot formed in the member 48, to prevent displacement of the members relative to each other.

As the gear 46 is keyed to the member 48, and said member connected to the member 49, by the strap 50, the member 49 will be driven in a forward direction, and relieved of any reverse motion or vibration of the gearing of the transmission mechanism due to the unwinding or yielding tendency of the strap 50, the strap neutralizing forces opposed to forward rotation. If, however, the drive is reversed until the pins 51 come into positive engagement at the end of the slot in the member 48, a rigid connection is made, but in which instance the strap 50 is not brought into action. The sleeve 47 serves also as a clutch member, provided with clutch teeth 52, adapted to engage with the clutch teeth of the clutch member 53, fixed to the sleeve hub 54, of the gear 55. Said sleeve hub is journaled in the bearings 56, arranged intermediate of the bearings 3, 4, and concentric with the spindle 2, which independent journaling of the sleeve hub 54 enables the same to be revolved concentric with the spindle 2, but free from contact therewith, eliminating all driving strain from the spindle. Thus, when the sleeve 47 is shifted to the left, to bring its clutch teeth 52 into engagement with the clutch member 53, the hub sleeve 54 will be in driving connection with the driving mechanism, heretofore described, and the power transmitted through the spindle to the following connections:—57 represents a toothed plate fixed to the gear 55, with the teeth 58 thereof projected through and engaging with notches formed in the disk plate 59, which plate is keyed or fixed to the sleeve 60, journaled in the bearing 4 and through which the spindle projects. Said spindle in turn is keyed to the spindle 2. This arrangement relieves the gearing of any lateral strains imparted to the spindle by reason of the floating connection between the members 57 and 59. This construction relieves the spindle of driving strains or torsion and relieves the driving mechanism of spindle strains, thereby insuring more accurate work and finer finishing cuts and eliminates, what is termed in trade, "gear marks," on the work machine.

As illustrated, the higher speeds are all for controlling two different types of drive or functioning two or more different elements by a single lever may be variously modified over the construction herein illustrated and described, but the means shown form a very positive and simple construction, and, I therefore, do not wish to be limited to the precise form unless specific mention is made thereof in the claims.

As shown in Fig. 1, the spindle is secured to the sleeve 60, which sleeve has its free end of cup-shaped form, threaded and adapted to receive the face plate 96, thereby providing an independent replaceable bearing for said face plate and relieving the spindle from lateral strains as much as possible and rendering the same readily renewable, increasing the life of the spindle.

87 represents the center pin mounted within the spindle in the usual manner.

88 represents a gear fixed to the spindle for conveying motion to the gear mechanism for driving the feed screw common in all well-known types of engine lathes.

Having described my invention, I claim:—

1. In a lathe head-stock, a frame, a spindle journaled therein, a driving element therefor concentric with the spindle and journaled in bearings independent of the spindle to maintain the same free from bearing contact with the spindle, and means intermediate of and connecting said driving element and spindle for neutralizing forces opposed to the forward rotation of the spindle.

2. In a lathe head-stock, a frame, a spindle journaled therein, a driving element concentric with the spindle journaled in bearings independent of the spindle bearings and free from frictional contact therewith, mechanism interposed between said driving element and spindle comprising two members, one in connection with the driving element and the second with the spindle, and a strap connecting said members coupling the drive in one direction of movement between said members and releasing the same in a reverse direction.

3. In a lathe head-stock, a frame, a spindle journaled therein, a driving element therefor concentric with the spindle and journaled in bearings independent of the spindle and free from bearing contact therewith, coupling means intermediate of the driving element and spindle, connecting said members in one direction of rotation and releasing the same on reverse impulses or partial rotation.

4. In a lathe head-stock, a frame, a spindle journaled therein, a driving element therefor, concentric with the spindle and journaled in bearings independent of the spindle free from contact therewith, coupling means interposed between said driving element and spindle, comprising means positively rotating the spindle in one direction of the driving element, and releasing the same in a reverse rotation, and means for relieving the driving element of spindle strains.

5. In a lathe head-stock, a frame, a spindle journaled therein, a driving element therefor concentric therewith and journaled in bearings independent of the spindle and free from contact with the spindle, coupling means capable of neutralizing forces opposed to the forward rotation of the spindle intermediate of and connecting said driving element and spindle.

6. In a lathe head-stock, a frame, a spindle journaled therein, a driving pulley, a variable speed system of gearing between the driving pulley and spindle, two driven shafts concentric with each other and with the driving pulley, each in connection with certain gears of said system of gearing, and clutching mechanism for alternately engaging said driving pulley with said concentric shafts.

7. In a lathe head-stock, a frame, a spindle journaled therein, a driving element therefor concentric therewith and journaled in bearings independent of the spindle, and free from bearing contact therewith, a main driving pulley, two driven shafts concentric with each other and with the driving pulley, clutching mechanism for alternately engaging said driving pulley with said concentric shafts, a variable speed system of gearing between said spindle driving element and concentric shafts operating in varying trains relative to the connection of one of said concentric shafts with said driving pulley.

8. In a lathe head-stock, a frame, a spindle journaled therein, a driving element therefor, concentric with the spindle and journaled in bearings independent of the spindle, a main driving pulley, a system of variable speed gearing between said driving elements of the spindle and main driving pulley, means for securing a varying ratio of speeds between the spindle driving element and pulley, through said variable speed system of gearing controlled thereby, back lash means intermediate of the driving element and spindle, a system of gearing between said back lash mechanism and spindle, means for connecting and disconnecting said back lash mechanism with said spindle and simultaneously controlling the driving connection through said second variable speed system of gearing with the spindle.

9. In a lathe head-stock, a frame, a spindle journaled therein, a driving element therefor concentric therewith, a main driving pulley, a variable speed system of gearing between said spindle driving element and driving pulley, back lash mechanism between said variable speed system of gearing, and spindle driving elements and in connection therewith, a second variable speed system of gearing in connection with said first and driving element for the spindle, and means for controlling simultaneously the connection of back lash mechanism, and the second variable speed system of gearing with the spindle, whereby the one is disconnected during the movement of connecting the other.

10. In a lathe head-stock, a spindle in combination with means for driving the same at varying speeds, comprising first and second concentric shafts, a driving pulley concentric with said shafts, means for alternately connecting said shafts with said pulley, a system of varying speed gearing connecting the spindle with the first shaft, and gearing connecting the second shaft with the first.

11. In a lathe head-stock, a spindle, in combination with means for rotating said spindle at varying speeds, comprising a main driving pulley, a pair of shafts concentric with each other and the driving pulley, clutching mechanism for alternately engaging said driving pulley with one of said shafts, a third shaft, a series of gears loose on said shaft, and a series of gears fixed on said shaft, gearing coöperating with said loose gears to connect said concentric shafts, a series of sliding gears on one of said concentric shafts, adapted to engage with the fixed gears on said third shaft, and a gear loose on said concentric shaft in mesh with a gear on said third shaft, means for clutching said loose gear to its shaft when the sliding gears are out of mesh with the gears on the third shaft, and means for controlling said sliding gears coördinately with the controlling mechanism of the driving pulley, whereby the power is cut off to said gearing in advance of a shifting of the same.

12. A device of the nature disclosed combining a pair of members each adapted to be translated in a direction different from the other, a lever, independent means connecting said lever to each of said members adapting either to function as a fulcrum about which said lever may turn to translate the other.

13. A device of the nature disclosed combining a pair of members each adapted to be translated in a direction different from the other, a lever, independent means connecting said lever to each of said members adapting either to function as a fulcrum about which said lever may turn to translate the other, a speed-changing mechanism controlled by one member, and a clutch mechanism controlled by the other member.

14. A device of the nature disclosed combining two concentric shafts, a driving member therefor, clutch mechanism for alternately independently connecting said shafts and driving member, a gear functioning as an element of a variable speed system of gearing slidably mounted on one of said shafts, and a lever movable in a plane diametrically from a position of neutrality for operating said clutch mechanism for alternately connecting said shafts and driving member and in an intersecting plane from the position of neutrality of the former for sliding said gear.

15. A device of the nature disclosed combining a pair of members each adapted to be translated in a direction different from the other, a lever, independent means connecting said lever to each of said members adapting either to function as a fulcrum about which said lever may turn to translate the other, and means having a neutral point at which said lever can be swung on either fulcrum and to confine the same to one fulcrum when deranged from said neutral point.

In testimony whereof, I have hereunto set my hand.

WILLIAM L. SCHELLENBACH.

Witnesses:
OLIVER B. KAISER,
CLARENCE B. FOSTER.